US009738750B2

(12) United States Patent
Lal et al.

(10) Patent No.: US 9,738,750 B2
(45) Date of Patent: *Aug. 22, 2017

(54) ONE COMPONENT EPOXY CURING AGENTS COMPRISING HYDROXYALKYLAMINO CYCLOALKANES

(71) Applicant: EVONIK DEGUSSA GMBH, Essen (DE)

(72) Inventors: Gauri Sankar Lal, Whitehall, PA (US); Gamini Ananda Vedage, Bethlehem, PA (US); Stephen Michael Boyce, Bath, PA (US); Dilipkumar Nandlal Shah, Wescosville, PA (US); Atteye Houssein Abdourazak, Allentown, PA (US)

(73) Assignee: Veonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,265

(22) Filed: Apr. 5, 2013

(65) Prior Publication Data

US 2014/0303342 A1  Oct. 9, 2014

(51) Int. Cl.
*C08G 59/50* (2006.01)
*C08G 59/56* (2006.01)

(52) U.S. Cl.
CPC ........... *C08G 59/56* (2013.01); *C08G 59/506* (2013.01)

(58) Field of Classification Search
CPC ..... C08L 63/00; C08G 59/24; C08G 59/4021; C08G 59/4057; C08G 59/4014; C08G 59/5066; C08G 59/5073; C08G 59/504; C08G 59/5026; C09D 163/00
USPC ........................................................ 525/533
See application file for complete search history.

(56) References Cited

U.S. PATENT DOCUMENTS

| | | | |
|---|---|---|---|
| 2,890,194 A | 6/1959 | Phillips et al. | |
| 3,519,576 A | 7/1970 | Johnson | |
| 3,520,905 A | 7/1970 | Johnson | |
| 3,839,281 A | 10/1974 | Dreher | |
| 3,862,150 A | 1/1975 | Bechara et al. | |
| 4,165,412 A | 8/1979 | Bechara et al. | |
| 4,268,656 A * | 5/1981 | Ray-Chaudhuri et al. | ... 528/103 |
| 4,546,155 A * | 10/1985 | Hirose | ........ C08G 59/182 525/504 |
| 4,689,390 A | 8/1987 | Suzuki et al. | |
| 4,866,133 A | 9/1989 | Andrews et al. | |
| 5,650,477 A | 7/1997 | Parodi et al. | |
| 5,994,475 A * | 11/1999 | Roth et al. | ........ 525/326.7 |
| 7,910,667 B1 | 3/2011 | Vedage et al. | |
| 2010/0227981 A1* | 9/2010 | Chiba et al. | ........ 525/408 |
| 2012/0077943 A1 | 3/2012 | Abdourazak et al. | |

FOREIGN PATENT DOCUMENTS

| | | |
|---|---|---|
| GB | 806259 A * | 12/1958 |
| JP | S50065595 | 10/1973 |
| JP | S60011527 | 1/1985 |
| JP | S61081427 | 4/1986 |
| JP | H11292956 | 10/1999 |
| JP | 2003293160 | 10/2003 |
| JP | 2011256243 | 12/2011 |
| JP | 2013117003 | 6/2013 |
| WO | 2008/152004 A1 | 12/2008 |
| WO | 2009/089145 A1 | 7/2009 |

OTHER PUBLICATIONS

Hamerton, "Recent Developments in Epoxy Resins" Section 3.6.4, p. 28, Dec. 1, 1997.*
ThreeBond Technical News, Dec. 20, 1990.*
Tanaka, Y.; "Snythesis and Characteristics of Epoxides"; C.A. May, ed.; Epoxy Resins Chemistry and Technology; Marcel Dekker; 1988.
U.S. Appl. No. 13/779,842; "Anhydride Accelerators for Epoxy Resin Systems"; filed Feb. 28, 2013.
Dawson, D.; "Cured-in-Place Pipe: Trenchless Trends"; Composites; Dec. 2012.
J. D. B. Smith, "Metal Acetylacetonates as Latent Accelerators for Anhydride-Cured Epoxy Resins," Journal of Applied Polymer Science, vol. 26, (1981), pp. 979-986.
Database WPI, Week 200420, Thomson Scientific, London, GB; AN 2004-206566 & JP 2003 293160 A (Kawasaki Steel Corp) Oct. 15, 2003.

* cited by examiner

*Primary Examiner* — Christopher M Rodd
(74) *Attorney, Agent, or Firm* — Andrew H. Chung; Linda S. Li; Jason S. Ngui

(57) ABSTRACT

Liquid epoxy curing agents that have improved latency over conventional liquid curing agents while retaining the physical properties of the cured material are disclosed. These liquid curing agents can be used for curing epoxy resins, or in combination with dicyandiamide (DICY) based curing agents in order to accelerate DICY curing.

17 Claims, No Drawings

ONE COMPONENT EPOXY CURING AGENTS COMPRISING HYDROXYALKYLAMINO CYCLOALKANES

CROSS-REFERENCE TO RELATED APPLICATIONS

The subject matter disclosed herein is related to copending and commonly assigned patent application Ser. No. 13/779,842, filed on Feb. 28, 2013 and entitled "Anhydride Accelerators for Epoxy Resin Systems". The disclosure of U.S. application Ser. No. 13/779,842 is hereby incorporated by reference.

BACKGROUND OF THE INVENTION

Compositions comprising an epoxy resin and a curing agent have been known for decades. Many curing agents are reactive with the epoxy resin at room temperature and, therefore, need to be mixed with an epoxy resin immediately prior to use. These compositions are known as two component (2K) epoxy systems. Others known as latent hardeners are stable in an admixture with the epoxy resin at ambient temperature and effect hardening only when heated to elevated temperature. Some compounds also act as accelerators of the latent curing agent, dicyandiamide (DICY) and effect cure of epoxy resins at elevated temperatures. These are known as one component (1K) epoxy curing systems. In some cases, a one-component epoxy based adhesive system is preferred over a two-components system because it eliminates the mixing step, the required time to apply it, and the cooling during storage and shipping associated with the two-component system.

Most conventional one component (1K) epoxy curing systems are suspensions of solid compounds or mixtures in an epoxy resin which are latent by virtue of their low solubility in the epoxy matrix. Examples of these are described in U.S. Pat. Nos. 3,519,576; 3,520,905; and 4,866,133 in which the curing agents are solids formed from polyamines with phenols. The polyamines contain at least two amine groups with at least one being a primary amine.

In U.S. Pat. No. 4,689,390 a latent curing agent was prepared by reacting a diamine bearing a tertiary amine and a primary or secondary amino group with a poly-epoxy compound and a phenolic resin or phenolic compounds. A solution of a polyamine adduct with bisphenolic A diglycidyl ether in poly-phenolic resins was described in US Patent Pub No US-2012-0077943-A1. U.S. Pat. No. 7,910,667 describes a polyphenolic resin solution of a polyurea derivative of a polyamine which has been used as a latent epoxy curing agent.

WO 2008/152004 A1 discloses using liquid imidazolium salts (ionic liquids) for curing epoxy compositions. These liquids are described as latent catalysts for these epoxy compositions. U.S. Pat. No. 3,839,281 describes the use of N-hydroxyethyl piperidines and piperazyl compounds as accelerators for epoxy resins systems cured with DICY.

The previously identified patents and patent applications are hereby incorporated by reference.

Liquid one component (1K) epoxy curing agents and DICY accelerators offer advantages over solid curing agents. Liquids can provide better mixing than solids which is valued in certain applications. For example in applications involving electronic components, liquid curing agents reduce the potential for "hot spots" within the curing epoxy resin which can damage these components. As a result, there is a need in this art for liquid latent epoxy curing agents which exhibit prolonged storage stability at ambient temperature and cure rapidly at temperatures greater than about 80° C.

BRIEF SUMMARY OF THE INVENTION

The instant invention solves problems associated with conventional curing agents by providing liquid epoxy curing agents that have improved latency over conventional liquid curing agents while retaining the physical properties of the cured material. By "latency" or "latent" it is meant that the curing agent and epoxy resin can be combined and substantially no curing or interaction between the curing agent and epoxy resin occurs until the combination is heated to an elevated temperature, and in some aspects of the invention, latency has the meaning described in Example 3. The inventive liquid curing agents can be used for curing epoxy resins, or in combination with dicyandiamide (DICY) based curing agents in order to accelerate DICY curing. By "cure" or "curing" it is meant that the epoxy resin is reacted with the curing agent to produce a polymeric composition consisting of polyether groups.

In one aspect of the invention, the inventive curing agents have been found to be particularly useful for refurbishing water pipes which utilize a one component epoxy resin system to generate a epoxy polymer for sealing holes and imperfections in the pipes. This technique is more popularly known as cured in place pipes(CIPP) as described in greater detail by Dawson, D, in Composites World, December 2012; hereby incorporated by reference.

DETAILED DESCRIPTION OF THE INVENTION

The instant invention relates to carboxylic acid salts of certain tertiary amines, and usage of the salts as liquid latent curing agents or in combination with DICY as accelerators in order to provide one component (sometimes referred to as 1K) epoxy compositions. The inventive carboxylic acid salts are latent curing and can provide rapid cure, or cure acceleration when heated to elevated temperatures of greater than about 50° C., greater than about 80 C, greater than about 130 C and in some cases greater than 150 C (e.g., curing at a temperature between 130 and 150 C). Epoxy compositions containing the inventive curing agent can have a delta H in J/g from about 120 to about 400, about 200 to about 400 and in some cases about 210 to about 390 (J/g), and glass transition temperature (Tg) of about 90 to about 130, about 95 to about 110 and in some cases about 110 to about 125 C. Epoxy resin articles cured by the inventive curing agent can have a flexural modulus of about 14,000 to about 450,000, about 300,000 to about 400,000, and in some cases about 300,000 to about 320,000 psi.

When the inventive catalyst is employed in a 1K epoxy composition, the amount of catalyst can range from about 2 phr to about 10 phr, about 2 phr to about 5 phr and in some cases about 8 phr to about 10 phr of the composition. When the inventive catalyst is employed for accelerating the curing of a DICY cured composition, the amount of catalyst can range from about 1 phr to about 5 phr, about 2 phr to about 5 phr and in some cases about 1 phr to about 2 phr of the composition.

By "liquid" it is meant that the inventive curing agents have a viscosity of about −150 cP to about 200 cP as measured by a Brookfield viscometer. In comparison to conventional solid curing agents, the inventive liquid curing agents can be more intimately combined with an epoxy resin thereby permitting a more uniform and thorough latent curing. For example, an epoxy composition comprising the inventive liquid curing agents can have a viscosity ranging from about 6000 cP to about 20,000 cP for a period of about 2 days to about 8 days when measured at a temperature of about 25 C.

The structure of an inventive carboxylic acid curing agent is represented by:

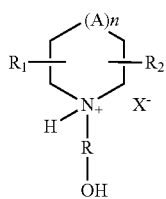

Wherein A is —O, CH$_2$, NR' R' is H, alkylene chain of 1-10 carbon atoms, R is an alkylene chain of 1-6 carbon atoms preferably 1-3 carbon atoms and the hydroxyl group may be attached to any of the carbon atoms but preferably on the end carbon atom; R$_1$,R$_2$may be H, or alkyl (1-20 carbon atoms) preferably lower alkyl of 1-7 carbon atoms, haloalkyl (1-20 carbon atoms), aryl, hydroxyl and alkyl (1-7 carbon atoms); X$^-$is a carboxylate anion of 1-40 carbon atoms and n is 1.

Examples of compounds represented by the structure comprise at least one member selected from the group consisting of N-hydroxyalkylpiperidinyl (A=CH$_2$, n=1), N-hydroxyalkylmorpholinyl (A=O), N-hydroxypiperazinyl (A=NR$_3^+$X$^-$), and N-hydroxypyrrolidinyl compound (A=CH$_2$, n=0). These compounds may contain at least one and at most four substituents on the ring carbon atoms. Tertiary amine salts of the amines represented with dicarboxylic and tricarboxylic acids are also included in this invention. For a dicarboxylic acid the salt is formed from two mole equivalent of the amine with one mole equivalent of the acid while with tricarboxylic acid the salt is formed from three mole equivalent of the amine with one equivalent of the acid.

While any suitable tertiary amine can be used for making the inventive carboxylic salt, representative tertiary amines comprise at least one member selected from the group consisting of N-hydroxyethylpiperidine, N-hydroxypropylpiperidine, 2-methyl-N-hydroxyethylpiperidine, N-hydroxymethylpiperidine, N-hydroxyethylmorpholine, 1,4-bis (2-hydroxyethyl)piperazine. While any suitable carboxylic acid can be used for making the inventive carboxylic acid salt of a tertiary amine, representative carboxylic acids comprise at least one member selected from the group consisting of acetic acid, propanoic acid, hexanoic acid, 2-ethylhexanoic acid, decanoic acid, tall oil fatty acid (TOFA), and dimer acid.

Tertiary amine salts of the invention can be formed by contacting at least one suitable amine with at least one carboxylic acid (e.g., tertiary amine salts of the amines represented with dicarboxylic and tricarboxylic acids) The tertiary amine (1 molar equivalent) is charged into a 3-neck round bottom flask equipped with a overhead mechanical stirrer and nitrogen inlet and thermocouple. The acid (1 molar equivalent) is added slowly to maintain the temperature at 25-30° C. while stirring for 60 minutes. The tertiary amine and the acid react to form a tertiary amine salt that has a light yellow liquid. When using a dicarboxylic acid to form the inventive salt, the salt is formed from two mole equivalent of the amine with one mole equivalent of the acid while with tricarboxylic acid the salt is formed from three mole equivalent of the amine with one equivalent of the acid.

While any suitable method can be used for contacting at least one tertiary amine with at least one carboxylic acid, an exemplary method comprises contacting N-hydroxyethylpiperidine with tall oil fatty acid. The molar ratio of tertiary amine to carboxylic acid can range from about 1.0 to about 1.05, about 0.95 to about 1.05 and in some cases about 1.0 to about 1.1.

These catalysts or curing agents may be used in a composition comprising an epoxy resin. Suitable epoxy resins can comprise the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

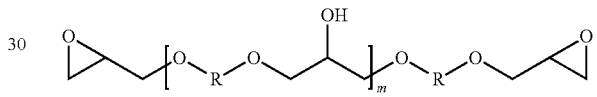

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in WO 2009/089145 A1, which is hereby incorporated by reference.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2- methylcyclohexyl-methyl-3,4-epoxy-3-methylcyclohexane carboxylate. Other suitable 3,4-epoxycyclohexylmentyl-3, 4-epoxycyclohexane carboxylates are described, for example, in U.S. Pat. No. 2,890,194, which is hereby incorporated by reference. In other embodiments, the epoxy component may include polyol polyglycidyl ether from polyethylene glycol, polypropylene glycol or polytetrahydrofuran or combinations thereof.

Epoxy resins that are commercially available under the trade name DER 383 (available from Dow) and EPON 826 (available from Hexion Specialty Chemicals) are suitable for this application. Other epoxy resins may include, but are not limited to, bi-functional epoxy resins, such as, bisphenol-A diglycidyl ether and bisphenol-F diglycidyl ether. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., Epoxy Resins Chemistry and Technology (Marcel Dekker, 1988), which is incorporated herein by reference. The amount of epoxy resin will typically range from about 80% to about 99%, about 95% to about 99% and in some cases about 95% to about 99% of the composition.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like. The amount of monofunctional epoxide can range from about 10% to about 1%, about 10% to about 5% and in some cases about 5% to about 1% of the composition.

Other additives that can be employed in the compositions and formulations of this invention include, but are not limited to, accelerators, fillers, fibers such as glass or carbon fibers, pigments, pigment dispersing agents, rheology modifiers, thixotropes, flow or leveling aids, defoamers, or any combination thereof. It is understood that other mixtures or materials that are known in the art can be included in the compositions or formulations and are within the scope of the present invention. The amount of such additives can comprise about 10% by wt. to about 60% by wt. about 20% by wt. to about 40% by wt. and in some cases about 10% by wt. to about 20% by wt. of the composition.

While the inventive salts can be used with styrene and styrene containing compounds, in one aspect of the invention, the inventive curing agent is substantially free of styrene and styrene containing compounds. By "substantially free" it is meant that the inventive curing agent and compositions comprising the inventive curing agents contain less than about 0.05 wt %, less than about 0.1 wt % and in some cases 0 wt. % of styrene and styrene containing compounds.

In one aspect of the invention, the inventive curing agent as well as the epoxy resin composition are substantially free of anhydrides. By "substantially free of anhydrides it is means that the inventive curing agent and compositions comprising the inventive curing agents contain less than about 0.05 wt %, less than about 0.1 wt % and in some cases 0 wt. % of anhydrides.

Another aspect of the invention relates to a composition comprising about 75 wt % to about 99 wt % of at least one of the previously described epoxy resins and about 25 wt % to about 1 wt % of the inventive amine salts. In another aspect the invention relates to a composition comprising about 90 wt % to about 95 wt % of at least one of the previously described epoxy resins, about 10 wt % to about 2 wt % of the inventive amine salts and about 8 wt % to about 3 wt % of DICY.

The following Examples are provided to illustrate certain aspects of the invention and do not limit the scope of the appended claims. Table 1 through 3 summarize the data generated by the Examples.

Table 1 below compares the thermal behavior of a mixture of the inventive amine salts and an epoxy resin. In particular, Table 1 illustrates that the:

(a) inventive amine salts can function as active accelerators for DICY and, if desired, as the sole curing agents in epoxy systems; and, (b) carboxylic acid used to prepare the amine salts of this invention are in-active as epoxy curatives as indicated by the negligible heat of reaction when contacting the epoxy system.

Table 2 below compares the latency of the inventive amine salts with tertiary amines. In particular, Table 2 illustrates that the:

(a) inventive amine salts show greater latency than previously described imidazole based ionic liquids (WO 2008/152004 A1 hereby incorporated by reference);

(b) inventive amine salts show longer latency than precursor tertiary amine N-Hydroxyethylpiperidine, and N-hydroxyethylpyrrolidine that were used in preparing the amine salts (e.g., respectively 3-8d versus<1 day as DICY accelerators and respectively (e.g., 2d versus<1 d as sole curing agents);

(c) inventive amine salts show at least a two-fold longer latency in comparison to the corresponding salts of other tertiary amines not bearing a hydroxyl group on the alkyl chain attached to the nitrogen atom. For example, compare N-hydroxyethlpiperidine, N-hydroxyethylmorpholine, 1,4-bis(2-hydroxyethyl)piperazine with 1-ethylpiperidine (e.g., respectively showing 3-8 days versus 2d as DICY accelerators) and N-hydroxyethylpiperidine, N-Hydroxyethylpyrrolidine with 1-ethylpiperidine (e.g., respectively 2d versus 1d as sole curing agent); and, (d) cycloaliphatic amine structure where the amine is substituted by a hydroxyalkyl group (as shown in the above structure of the inventive amine salt) is useful in order to impart greater latency. Other straight chain amines bearing a hydroxyalkyl group show shorter latency (e.g., respectively 3-8d versus 2d as DICY accelerators and 2d versus 1d as sole curing agents).

Table 3 shows the results of isothermal cure viscosity build and flexural strength of a cured epoxy product that was obtained by using a curing agent of this invention with epoxy resin. These results show that the curing agent of this invention can be used in pipe rehabilitation using the technique of cured in place pipes (CIPP), among other applications. The relatively long latency offered by the formulations or epoxy compositions of the present invention can reduce, if not, eliminate premature gelation during transportation of such compositions. In addition, the Differential Scanning calorimetric (DSC) isothermal data below show that the compositions are cured to a minimum of 85% when exposed to 80° C. for 2 hours. The cured epoxy formulations thus obtained meet the minimum requirement for flexural strength. The studied formulations would allow CIPP users to utilize epoxy based systems to wet out felts at their manufacturing locations and transport the felt to job sites for reverse insertion in an existing pipe.

EXAMPLES

Example 1

General Procedure for Preparation of Amine Salts

The tertiary amine (1 mole) was charged into a 3-neck round bottom flask equipped with a overhead mechanical stirrer and nitrogen inlet and thermocouple. The acid (1 mole) was added slowly to maintain the temperature at 25-30° C. while stirring for 60 minutes. The tertiary amine and the acid reacted to form a tertiary amine salt salt solution having a clear yellow appearance. On completion the mixture was cooled to room temperature and used in Differential Scanning calorimetry (DSC) and latency studies.

Example 2

DSC of Curing Agents with Epoxy Resin (a) DSC as DICY Accelerator

Samples of the amine solutions were intimately mixed with dicyandiamide (DICY) and bisphenol A diglycigyl ether (2:6:100 mass ratio) and analyzed by DSC (TA Instruments QA20) using a program installed in the DSC that starts at 25° C. and heats at 10° C./minute up to 300° C., cools and scans a second time to 250° C. The first scan provides cure data including onset temperature, peak exotherm and heat of reaction, while the second scan confirms the glass transition temperature. The results are shown in the Table 1 *a below:*

TABLE 1a

DSC of curing agents as DICY accelerators

| Curing agent/DICY (2/6 phr) | Onset temperature (° C.) | H (J/g) | $T_g$ |
|---|---|---|---|
| DICY | 194 | 301.7 | Not observed |
| Acetic acid salt of N-hydroxyethylpiperidine | 130 | 292.5 | 98 |
| Tall oil fatty acid salt (TOFA) of N-hydroxyethylpiperidine | 133 | 212.7 | 106 |
| Acetic acid salt of N-hydroxyethylmorpholine | 148 | 131.8 | 100 |
| TOFA salt of N-hydroxyethylmorpholine | 162 | 127.2 | 108 |
| Acetic acid salt of 1,4-bis(2-hydroxyethyl)piperazine | 119 | 385 | 100 |
| TOFA salt of 1,4-bis(2-hydroxyethyl)piperazine | 152 | 140.7 | Not observed |
| 1-Butyl-3-methylimidazolium acetate (imidazole ionic liquid) | 128 | 456 | 121 |
| Acetic acid salt of 1-Ethylpiperidine | 121 | 351.2 | 104 |
| TOFA salt of 1-ethylpiperidine | 120 | 257.6 | 109 |

TABLE 1a-continued

DSC of curing agents as DICY accelerators

| Curing agent/DICY (2/6 phr) | Onset temperature (° C.) | H (J/g) | $T_g$ |
|---|---|---|---|
| N-Hydroxyethylpiperidine | 118 | 318.6 | 119 |
| 1-(2-Hydroxyethyl)pyrrolidine | 101 | 386.1 | 120 |
| N,N-dimethylcyclohexane | 95 | 394.8 | 120 |
| Tall oil fatty acid | 192 | 336.8 | Not observed |
| Dimethylethanolamine | 89 | 412.3 | 116 |
| Tall oil fatty acid salt of N,N-dimethylcyclohexane | 121 | 288.9 | 119 |
| Tall oil fatty acid salt of dimethylethanolamine | 125 | 283.1 | 117 |

(b) Sole-cure

Samples of the amine salt solutions were intimately mixed with bisphenol A diglycidyl ether (respectively 10:100 or 5:100 mass ratio). A sample of this mixture was analyzed by DSC (TA Instruments QA20) using a program that starts at 25° C. and heats at 10° C./minute up to 300° C., cools and scans a second time to 250° C. The first scan provides cure data including onset temperature, peak exotherm and heat of reaction, while the second scan confirms the glass transition temperature. The results are shown in the Table 1b below:

TABLE 1b

DSC of curing agents (sole cure)

| Curing agent | Onset Temperature ° C. | H (J/g) | $T_g$ |
|---|---|---|---|
| Acetic acid salt of N-hydroxyethylpiperidine (10 phr) | 117 | 130.2 | Not observed |
| Acetic acid salt of N-hydroxyethylpyrrolidine (5 phr) | 122 | 136.8 | 67 |
| 1-butyl-3-methylimidazolium acetate (5 phr) | 98 | 472.7 | Not observed |
| 1-butyl-3-methylimidazolium acetate (10 phr) (imidazole ionic liquid) | 88 | 439.5 | Not observed |
| Acetic acid salt of 1-ethylpiperidine (5 phr) | 122 | 164 | 46 |
| TOFA salt of N,N-dimethylcyclohexylamine | 111 | 66.4 | Not observed |
| TOFA salt of dimethylethanolamine | 110 | 79.2 | Not observed |
| N-hydroxyethylpiperidine | 104 | 57.25 | 100 |
| N,N-dimethylcyclohexane | 84 | 91.31 | Not observed |
| Dimethylethanolamine | 81 | 337.2 | 80 |
| Tall oil fatty acid | No reaction | No reaction | None |

Example 3

Latency of Amine Curatives

The latency (for purposes of this Example 3 is defined as the time to double the initial viscosity at 25° C.) of curatives was monitored by a Brookfield Cone and Plate viscometer (model HADV II+CP) with a #52 spindle at 25° C. using 0.5 mL sample. Also shelf stability was determined by visual observation to determine gelation time. The results are shown in the Table 2a below:

(a) DICY Accelerators
Amine/DICY/bisphenol A diglycidyl ether (respectively 2/6/100 mass ratio)

TABLE 2a

Latency of curing agents

| Curing agent/DICY(2/6 phr) | Latency d—day h—hour |
|---|---|
| Acetic acid salt of N-hydroxyethylpiperidine | 3 d |
| Tall oil fatty acid salt (TOFA) of N-hydroxyethylpiperidine | 3 d |
| TOFA salt of N-hydroxyethylmorpholine | 6 d |
| TOFA salt of 1,4-bis(2-hydroxyethyl)piperazine | 8 d |
| TOFA salt of 1,4-bis(2-hydroxyethyl)piperazine | 8 d |
| TOFA salt of 1-ethylpiperidine | 2 d |
| TOFA salt of N,N-dimethylcyclohexylamine | 2 d |
| TOFA salt of dimethylethanolamine | 2 d |
| 1-butyl-3-methylimidazolium acetate (10 phr) (imidazole ionic liquid) | 2 d |
| Acetic acid salt of N-ethylpiperidine | 1 d |
| N-Hydroxyethylpiperidine | <24 h |
| N,N-dimethylcyclohexane | <24 h |
| Dimethylethanolamine | <14 h |

(b) Sole Cure (amine/bisphenol A diglycidyl ether)

TABLE 2b

Latency of curing agents (sole cure)

| Curing agent | Latency d—day h—hour min—minute |
|---|---|
| Acetic acid salt of N-hydroxyethylpiperidine (10 phr) | 2 d |
| Acetic acid salt of N-Hydroxyethylpyrrolidine (5 phr) | 2 d |
| 1-Butyl-3-methylimidazolium acetate (5 phr) (imidazole ionic liquid) | 6 h |
| Acetic acid salt of 1-Ethylpiperidine (5 phr) | 1 d |
| TOFA salt of N,N-dimethylcyclohexane (5 phr) | 1 d |
| TOFA salt of dimethylethanolamine (5 phr) | 1 d |
| N-Hydroxyethylpiperidine (5 phr) | <24 h |
| N,N-Dimethylcyclohexane (5 phr) | <20 h |
| Dimethylethanolamine (5 phr) | 20 min |
| 1-(2-hydroxyethyl)pyrrolidine (5 phr) | <20 h |

Example 4

This Example illustrates the applicability of NHEP:Dimer (N-hydroxyethylpiperidine: dimer acid salt) and NHEP:TOFA (N-hydroxyethylpiperidine tall oil fatty acid salt) for use in cured in place pipes (CIPP). For this, 15 parts of the above two curing agents were used as a sole curatives with 100 parts of liquid epoxy resin. The mixed formulations were characterized for (1) viscosity increase as a function of time at 25° C. to reach 10,000 cPs in accordance with Example 3; (2) isothermal cure by DSC in accordance with Example 2 and (3) flexural modulus in accordance with ASTM C881 after mild heat cure at a temperature of 80 C in a temperature controlled oven for 2 hrThe data is summarized in Table 3.

TABLE 3

DSC profile, latency and flexural strength of NHEP/dimer acid and NHEP/TOFA cured with epoxy resin

| | | |
|---|---|---|
| Liquid Epoxy resin Epon 828 | 100 | 100 |
| NHEP/Dimer 2:1 mol | 15 | |
| NHEP/TOFA | | 15 |
| Mixed viscosity @ 25° C. after two minutes | 3688 | 5500 |
| Time to reach 10,000 cPs @ 25° C. (min.) | 2453 | 2728 |
| Initial DSC profile | | |
| Onset temp., ° C. | 109 | 112.14 |
| Peak temp., ° C. | 125 | 136.6 |
| Heat of RXn., ° C. | 59 | 120.7 |
| Isothermal Cure DSC after 2 Hr at 80° C. cure | | |
| Heat of RXn | 8.9 | 10.64 |
| % cure | 85% | 92% |
| After two Hour cure at 80° C. | | |
| Flexural Modulus (psi) | 14000 | 441000 |

Both formulations of this Example 4 offer acceptable mixed viscosity for CIPP application (e.g., a viscosity ranging from about 3688 cP to about 5500 cP at a temperature of about 25 C to about 28 C), and relatively long time (e.g., 2453 to-2728 minutes) to reach 10,000 cPs viscosity thereby illustrating excellent latency at 25° C. The DSC data show that NHEP/TOFA reached 92% cure after 2 hours cure at 80° C. The same formulation offers desirable flexural modulus.

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A latent heat curable composition comprising: i) dicyandiamide, ii) at least one liquid tertiary amine salt, and iii) at least one epoxy resin, and wherein the liquid tertiary amine salt comprises a salt of at least one carboxylic acid and at least one tertiary amine represented by the formula:

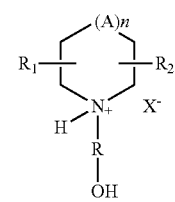

wherein A is oxygen, R is an alkylene chain of 1-6 carbon atoms and the hydroxyl group may be attached to any of the carbon atoms; $R_1$, $R_2$ are independently H, alkyl (1-20 carbon atoms), haloalkyl (1-20 carbon atoms), aryl, or hydroxyl; X— is a carboxylate anion of 1-40 carbon atoms; and n is 1;

and wherein the composition has a viscosity of about 6,000 to about 20,000cp at a temperature of about 25C and is at least 85% cured when exposed to a temperature of 80C for 2 hours.

2. The composition of claim 1 wherein the carboxylic acid comprises at least one member of selected from the group of acetic acid and TOFA.

3. The composition of claim 1 wherein the tertiary amine salt comprises N-hydroxyethylmorpholine.

4. The composition of claim 1 wherein the carboxylic acid comprises at least one member selected from the group consisting of acetic acid, propanoic acid, hexanoic acid, 2-ethyihexanoic acid, decanoic acid, tall oil fatty acid (TOFA), dimer acid and mixtures thereof.

5. The composition of claim 4 wherein the carboxylic acid comprises tall oil fatty acid.

6. The composition of claim 4 wherein the carboxylic acid comprises at least one member selected from the group of acetic acid and TOFA.

7. The composition of 4 wherein the carboxylic acid comprises hexanoic acid.

8. The composition of claim 6 wherein the tertiary amine comprises N-hydroxyethylmorpholine.

9. The composition of claim 1 wherein the tertiary amine comprises N-hydroxyethylmorpholine and the acid comprises TOFA.

10. The composition of claim 1 wherein the composition comprises about 90 to about 95 wt. % epoxy resins, about 2 to about 20 wt. % tertiary amine salts and about 3 to about 8 wt. % dicyandiamide.

11. The composition of claim 1 wherein the amount of tertiary amine salt ranges from about 2 to about 20 wt. % of the composition.

12. The composition of claim 1 wherein the epoxy resin comprises at least one multifunctional epoxy resin and at least one monofunctional epoxide.

13. The composition of claim 1 wherein the molar ratio of tertiary amine to carboxylic acid ranges from about 1.0 to about 1.1.

14. The composition of claim 1 wherein the composition has a delta H from about 120 to about 400 J/g.

15. A cured epoxy resin obtained from the composition of claim 1.

16. The cured epoxy resin of claim of claim 15 wherein the cured epoxy resin is cured within a pipe.

17. A latent curing and heat activated composition comprising: i) curing agent comprising dicyandiamide and at least one liquid tertiary amine salt curing agent accelerator having a viscosity of about 150 to about 200 cP, and ii) at least one epoxy resin; wherein the liquid tertiary amine salt comprises at least one salt of at least one carboxylic acid and N-hydroxyethylmorpholine and the carboxylic acid comprises at least one of hexanoic acid and tall oil fatty acid, and wherein the composition is at least 85% cured when exposed to a temperature of 80 C for 2 hours.

* * * * *